April 5, 1955

F. P. MASON ET AL 2,705,739

FACSIMILE TELEGRAPH SYSTEMS

Filed Oct. 16, 1952

2 Sheets-Sheet 1

Inventor
F. P. MASON-
A.T. WATTS
By [signature]
Attorney

April 5, 1955 F. P. MASON ET AL 2,705,739
FACSIMILE TELEGRAPH SYSTEMS
Filed Oct. 16, 1952
2 Sheets-Sheet 2
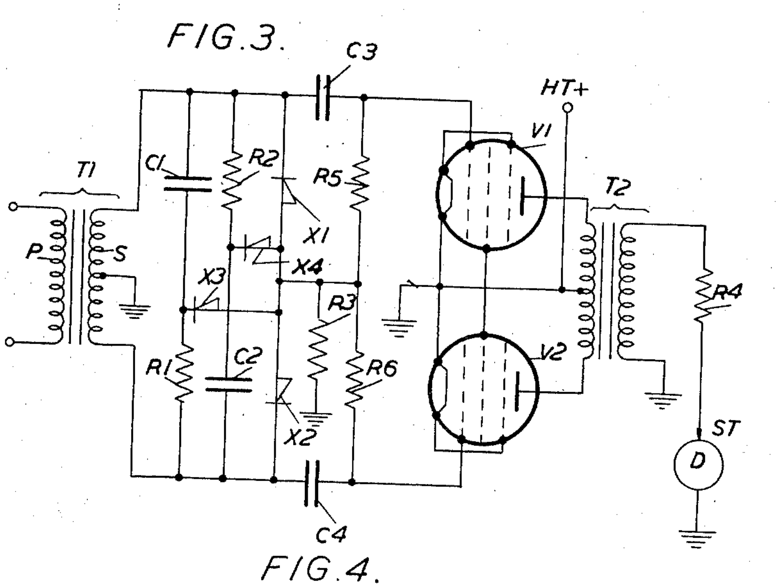
FIG.4.
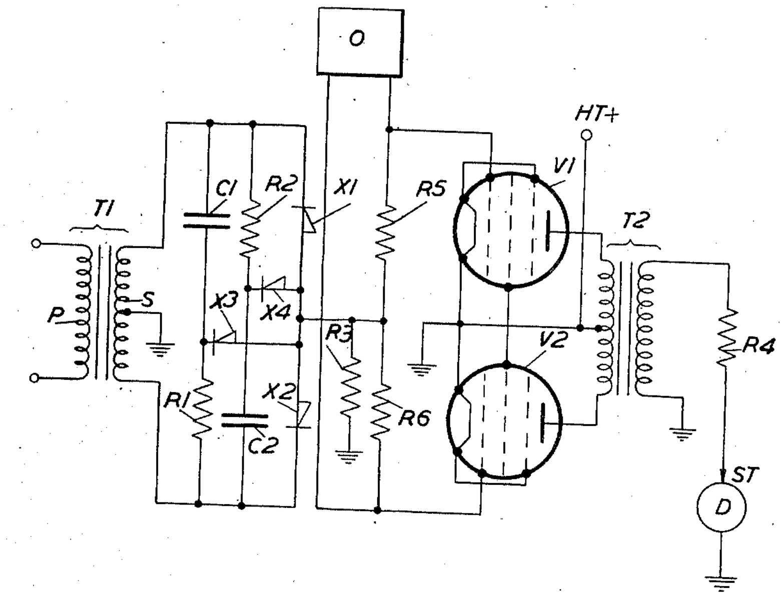
Inventor
F. P. MASON —
A. T. WATTS
By Robert Harding Jr.
Attorney United States Patent Office 2,705,739
Patented Apr. 5, 1955

2,705,739

FACSIMILE TELEGRAPH SYSTEMS

Frederick Percival Mason and Alan Thomas Watts, Croydon, England, assignors to Creed and Company Limited, Croydon, England, a British company Application October 16, 1952, Serial No. 315,075

Claims priority, application Great Britain November 2, 1951

5 Claims. (Cl. 178—5)

Figures 1, 2:
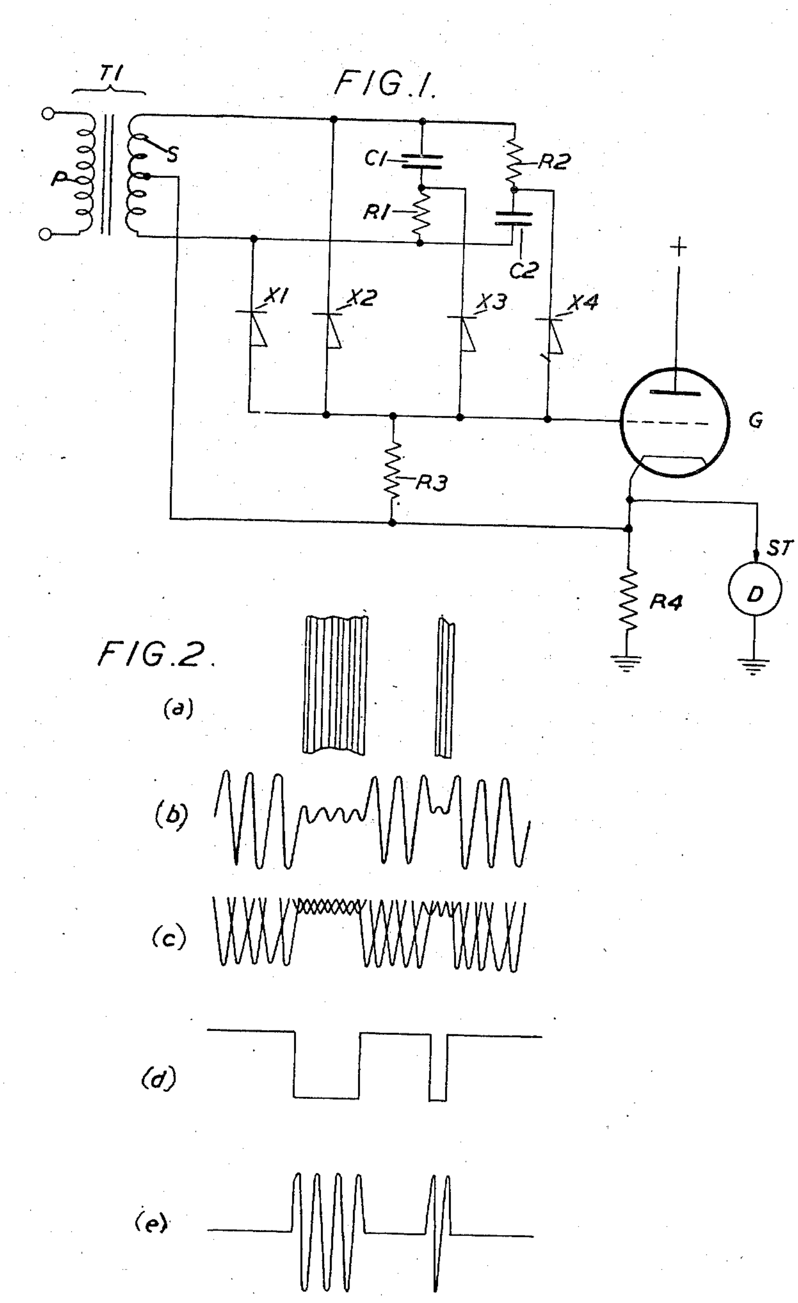

This invention relates to facsimile telegraph systems and, in particular, to means for inverting the signals in such systems.

It is well-known in the art of facsimile telegraphy that if optical scanning is employed at a transmitting machine a strong signal will be produced corresponding to white portions of the message or picture since these give the greatest light reflection and that, conversely, a weak signal will correspond to the black portions. It is also well known that if these signals are applied to control a recording machine from which a "positive" copy is required then some means of signal inversion must be employed in order that a strong signal shall leave the paper unmarked while a weak signal shall cause the stylus to record a black mark thereon.

According to the present invention there is provided a circuit arrangement for inverting facsimile signals, comprising a plurality of full-wave rectifying networks, means for applying the said signals in different phases to said rectifying networks to produce a substantially unidirectional control voltage, means for supplying energy via a gating device to the stylus of a facsimile recorder and means for applying said control voltage to said gating device in such manner as to cause the amount of energy supplied to said stylus to vary inversely with the strength of said control voltage.

Two embodiments of the invention will now be described with reference to the accompanying drawings of which:

Fig. 1 is a circuit diagram of a facsimile inverter according to the invention which is arranged to feed D. C. signals to the recording stylus, Fig. 2 represents a portion of a transmitted copy together with corresponding wave-forms to illustrate the working of the invention, Fig. 3 is a circuit diagram of a facsimile inverter according to the invention which is arranged to feed A. C. signals to the recording stylus, and Fig. 4 is a circuit diagram of a modified form of the inverter shown in Fig. 3.

Referring to Fig. 1, the primary winding P of a transformer T1 receives alternating-current facsimile signals from a telegraph line through a receiving amplifier which does not form part of this invention and has therefore not been shown. These signals are amplitude-modulated in accordance with the tones of the copy being scanned at the transmitter. Thus if Fig. 2 (*a*) represents a portion of the matter being scanned the received signals will be substantially as shown in Fig. 2 (*b*) the portions of maximum amplitude corresponding to the "white" portions of the original message.

The centre tap of the secondary winding S of transformer T1 is connected to one end of a load resistor R3. The opposite end of resistor R3 is connected via respective rectifiers X1 and X2 to the outer ends of the secondary winding. Thus the received signals are subjected to full-wave rectification and the polarities of the rectifiers X1 and X2 are arranged so that when the rectified current flows through resistor R3 the upper end thereof (in the figure) becomes progressively negative as the amplitude of the received signals increases. It will be most negative therefore when a "white" signal is being received.

Two further rectifiers X3 and X4 are also connected to the transformer secondary via respective resistance-capacity networks C1.R1 and C2.R2. These networks introduce a 90° phase-shift in the energy supplied to rectifiers X3 and X4. The output of this latter pair of rectifiers is combined with the output of rectifiers X1 and X2 by means of the common load resistor R3. The circuit just described provides in effect two-phase rectification and the combined rectified signal wave as shown in Fig. 2 (*c*) approximates more closely to a pure D. C. signal than if only one pair of rectifiers were employed.

The rectified facsimile signals are applied to the control grid of a gating tube G which is, in this embodiment, a triode. The anode of the tube G is connected to an appropriate anode potential supply and the cathode is connected to ground via a resistor R4. The stylus ST of a facsimile recorder is also connected to the cathode of tube G and is thus supplied with whatever voltage is developed across resistor R4.

The tube G is normally conducting and the voltage developed at the stylus ST is sufficient to cause a continuous black mark to appear on the paper or other recording medium (not shown) wrapped around the drum D. The density of the mark may be adjusted if required by making R4 a variable instead of a fixed resistor.

When a strong signal is received corresponding to a "white" portion of the message, the negative voltage developed across resistor R3 drives the grid of tube G sufficiently negative to stop the tube conducting. The voltage on the stylus ST falls to zero and no mark appears on the paper. The voltage wave applied to the stylus as a result of the scanning of the portions of message in Fig. 2 (*a*) is substantially rectangular in form as shown in Fig. 2 (*d*).

It is to be understood that although two-phase rectification has been shown as a means of obtaining an improved wave-form for application to the gating tube, three-phase or any other polyphase rectification could be employed if desired by providing additional rectifiers supplied through further networks for shifting the energy through the appropriate phase angle.

Furthermore it will be apparent that the stylus could be supplied from the anode of tube G provided that a suitable load resistor were connected between the anode and the anode potential supply.

In the circuit just described, direct current signals are supplied to the stylus ST. In the embodiment now to be described the stylus is supplied with alternating current.

Referring to Fig. 3, the received signals from the secondary of transformer T1 are shifted in phase and rectified in the same manner as before, the phase-shifting networks and rectifiers being identified by the same references as in Fig. 1, and the rectified signals from both pairs of rectifiers are combined via the common load resistor R3.

The rectified facsimile signals are applied via a pair of resistors R5 and R6 to the respective control electrodes of a pair of tubes V1 and V2 which are pentodes in this embodiment. The tubes V1 and V2 have a function analogous to that of the gating tube G in the circuit of Fig. 1 and their output circuits are connected in push-pull to the primary winding of an output transformer T2. The remaining connections to the tubes will be apparent from Fig. 3.

Tubes V1 and V2 are normally conducting and any signals applied via transformer T1 and capacitors C3 and C4 are normally amplified and applied to the stylus ST via transformer T2 and resistor R4, thus causing a black mark to appear on the recording medium wrapped around the drum D.

When a strong signal is received corresponding to a "white" portion of the message, the negative voltage developed across resistor R3 drives the control grids of tubes V1 and V2 sufficiently negative to stop the tubes conducting. The A. C. signal applied via the transformer T1 and capacitors C3 and C4 is therefore not amplified and no mark appears on the record. The envelope of the voltage applied to the stylus as a result of scanning the portions of message in Fig. 2 (*a*) is substantially rectangular in form as shown in Fig. 2 (*c*).

Fig. 4 shows a modification of the circuit shown in Fig. 3. In this modified circuit the signal connections from the transformer T1 to the control grids of tubes V1 and V2 are replaced by inputs in opposite phase from a local oscillator O. A steady tone is thus fed to tubes V1 and V2 irrespective of the received facsimile signals. The bias voltage developed across resistor R3 is applied to control the amplification of the local tone by tubes V1 and V2. Thus a strong received signal corresponding to "white" cuts off the tubes and amplified tone is only produced for "black" portions of the message.

The arrangement of Fig. 4 has the advantage over that of Fig. 3 in that a better tone-to-noise ratio is obtained with, in consequence, a more uniform recording of black marks. On the other hand, the arrangement of Fig. 4 suffers from the disadvantage that a separate oscillator must be provided.

In the embodiments which have been described it has been assumed that the inversion of the signals has been carried out at the receiver and that the signals after inversion are applied directly to the stylus of the recorder. It is to be understood that these examples are illustrative only and that the signals could if desired be further amplified before application to the stylus.

Furthermore, particularly in the case of the alternating-current circuits described in relation to Figs. 3 and 4, the inversion could be carried out at the transmitter and the inverted signals transmitted to the stylus over, for example, a telegraph line.

Accordingly, where in the claims reference is made to the application of inverted signals to the stylus of a recorder, it is to be understood that such application may be direct, may be via an amplifier, or (where inversion is effected at the transmitter) may be over a suitable transmission path.

While the principles of the invention have been described above in connection with specific embodiments, and particular modifications thereof, it is to be clearly understood that this description is made only by way of example and not as a limitation on the scope of the invention.

What we claim is:

1. A circuit arrangement for inverting facsimile signals, comprising a plurality of full-wave rectifying networks, means for simultaneously applying the said signals in different phases to both said rectifying networks to produce a substantially unidirectional control voltage, means for supplying energy via a gating device to the stylus of a facsimile recorder and means for applying said control voltage to said gating device to cause the amount of energy supplied to said stylus to vary inversely with the strength of said control voltage.

2. A circuit arrangement as claimed in claim 1 in which said gating device comprises a normally conductive vacuum tube having an anode, a cathode and at least one control grid, in which the output circuit of said tube is connected to a circuit supplying energy to said stylus and in which said control voltage is applied in a negative sense to said control grid to control the supply of direct current to said stylus.

3. A circuit arrangement as claimed in claim 1 in which said gating device comprises two normally conductive vacuum tubes each having an anode, a cathode and at least one control grid, in which the output circuits of said tubes are connected in a push-pull arrangement to a circuit supplying energy to said stylus and in which said control voltage is applied in a negative sense to the control grids of both said tubes to control the supply of alternating current to said stylus.

4. A circuit arrangement as claimed in claim 3 in which said alternating current is derived from the facsimile signals before rectification.

5. A circuit arrangement as claimed in claim 3 in which said alternating current is derived from a local oscillator.

References Cited in the file of this patent

UNITED STATES PATENTS

| | | |
|---|---|---|
| 2,315,362 | Wise | Mar. 30, 1943 |
| 2,546,466 | Marzan | Mar. 27, 1951 |